US005572516A

United States Patent [19]
Miya et al.

[11] Patent Number: 5,572,516
[45] Date of Patent: Nov. 5, 1996

[54] MOBILE UNIT COMMUNICATION SYSTEM

[75] Inventors: Kazuyuki Miya, Machida; Osamu Kato, Yokohama, both of Japan

[73] Assignee: Matsushita Electric Industrial Co., Ltd., Japan

[21] Appl. No.: 381,488

[22] Filed: Jan. 31, 1995

[30] Foreign Application Priority Data

Jan. 31, 1994 [JP] Japan ........................................ 6-9611

[51] Int. Cl.$^6$ ........................................................ H04J 13/00
[52] U.S. Cl. .......................... 370/18; 370/95.1; 370/95.3; 455/38.1; 455/54.1
[58] Field of Search ................................. 370/18, 29, 50, 370/60, 60.1, 61, 77, 95.1, 95.2, 95.3, 85.7, 8, 9, 10, 11, 12, 105.1, 105.2; 375/200, 203, 205, 237, 238, 239, 273, 293, 354, 356, 362, 365, 373, 375; 379/59, 60; 455/33.1, 33.2, 33.3, 13.2, 56.1, 38.1, 38.2

[56] References Cited

U.S. PATENT DOCUMENTS 5,371,734 12/1994 Fischer ........................................ 370/18

OTHER PUBLICATIONS

"Power Control in Packet Switched Time Division Duplex Direct Sequence Spread Spectrum Communications" by R. Esmailzadeh et al., 1992 IEEE pp. 989–992.

Primary Examiner—Douglas W. Olms
Assistant Examiner—Dang Ton
Attorney, Agent, or Firm—Rossi & Associates

[57] ABSTRACT

A mobile unit communication system comprises: mobile units; a TDMA base station for transmitting and receiving a TDMA signal having a first frame to/from mobile units within a service area thereof in a TDMA/TDD manner; and a CDMA base station adjacent to the TDMA base station, for transmitting and receiving a CDMA signal having a second frame to/from mobile units in a CDMA/TDD manner, at least one of these base stations having a frame synchronizing circuit for detecting a phase between the first and second frames and synchronizing the first and second frames according to the detected phase. Each mobile unit has a first circuit for communicating with the TDMA base station in a TDMA mode; and a second circuit for communicating with the CDMA base station in a CDMA mode. First and second frames have the same length and are synchronized to eliminate the necessity of synchronizing operation when the mobile unit moves to the other service area. A unique word attached to a framed data is commonly defined between the TDMA and CDMA signals, so that a unique word detection circuit can be used commonly. The TDMA and CDMA signals have the same frequency band, so that the antenna portion can be used commonly. The TDMA and CDMA signals have the same amount of data per channel in a frame, so that modulation and demodulation circuits can be used commonly.

35 Claims, 7 Drawing Sheets

MOBILE UNIT COMMUNICATION SYSTEM

BACKGROUND OF THE INVENTION

1. Field of the Invention

This invention relates to a mobile unit communication system for providing communication between a base station and a plurality of mobile units within a service area.

2. Description of the Prior Art

A first prior art mobile unit communication system for providing communication between one of base stations and a plurality of mobile units within a service area of the base station through the Time Division Multiple Access/Time division Duplex (TDMA/TDD) method is known. In the Time Division Multiple Access, a plurality of channels are, i.e., the multiple access is, provided by using a radio wave through time-division. Therefore, a plurality of mobile units in a service area of a base station can communicate with the base station substantially at the same time. Time Division Duplex means that the reception of data and transmission of data are switched by time-division, i.e., the reception of the data and the transmission of data are effected alternately.

A second prior art mobile unit communication system for providing communication between one of base stations and a plurality of mobile units within a service area of the base station through the Code Division Multiple Access/Time division Duplex (CDMA/TDD) method is proposed in "POWER CONTROL IN PACKET SWITCHED TIME DIVISION DUPLEX DIRECT SEQUENCE SPREAD SPECTRUM COMMUNICATIONS", by R. ESMAILZA-DEH, M. NAKAGAWA, A. KAJIWARA, proc. of VTC '92, PP.989–992, 1992. In the Code Division Multiple Access, a plurality of channels are, i.e., the multiple access is, provided by using a radio wave through spread-spectrum with different coding signals for spread-spectrum. Therefore, a plurality of mobile units in a service area of a base station can communicate with the base station at the same time. Time Division Duplex means that the reception of data and transmission of data are switched by time-division, i.e., the reception of the data and the transmission of data are effected alternately.

SUMMARY OF THE INVENTION

The aim of the present invention is to provide an improved mobile unit communication system.

According to the present invention there is provided a first mobile unit communication system comprising: mobile units; a TDMA (Time Division Multiple Access) base station for transmitting and receiving a TDMA signal having a first frame to/from mobile units within a service area thereof in a TDMA/TDD/Time division Duplex) manner; and a CDMA (Code Division Multiple Access) base station adjacent to the TDMA base station, for transmitting and receiving a CDMA signal having a second frame to/From mobile units in a CDMA/TDD (Code Division Multiple Access/ Time division Duplex) manner, at least one of these base stations having a frame synchronizing circuit for detecting a phase between the first and second frames and synchronizing the first and second frames according to the detected phase. Each mobile unit has a first circuit for communicating with the TDMA base station in a TDMA mode; and a second circuit for communicating with the CDMA base station in a CDMA mode. First and second frames have the same length and are synchronized to eliminate the necessity of synchronizing operation when the mobile unit moves to the other service area. A unique word attached to a framed data is commonly defined between the TDMA and CDMA signals, so that one unique word detection circuit can be used in both TDMA and CDMA modes. The TDMA and CDMA signals have the same frequency band, so that one antenna portion can be used in both TDMA and CDMA modes. The TDMA and CDMA signals have the same amount of data per channel in a frame, so that modulation and demodulation circuits can be used commonly.

According to the present invention there is also provided a second mobile unit communication system comprising: mobile units; a first base station, having a first service area, for transmitting and receiving first and second CDMA signals to/from mobile units within the first service area respectively, the first CDMA signal having a first frame which includes a plurality of first channels in a time division multiple access and time division duplex manner; and a second base station, having a second service area, for transmitting and receiving first and second TDMA signals to and from mobile units within the second service area respectively, the first TDMA signal having a second frame which includes a plurality of second channels in a code division multiple access and time division duplex manner, the first frame has the same length as the second frame, at least one of the first and second base stations further having a frame synchronizing circuit for detecting a phase between the first and second frames and synchronizing the first and second frames each other in accordance with the detected phase, each of the mobile units having: a baseband circuit for framing data to be transmitted on the basis of a frame signal and for digital-modulation the data framed to produce first and second baseband signals in first and second modes respectively; a up-converting circuit for frequency-up-converting the first baseband signal in the first mode and the second baseband signal in the second mode, a transmission power control circuit for controlling of a power of an output signal from the up-converting portion; an antenna portion for, in a transmission mode, transmitting an output of the transmission control circuit as the second TDMA signal in the first mode and as the second CDMA signal in the second mode and for, in a receiving mode, receiving the first TDMA signal in the first mode and first CDMA signal in the second mode, the transmission and receiving modes being effected in a time division duplex manner; demodulation circuit for demodulating the first TDMA and first CDMA signals from the antenna in the first and second modes respectively; and a frame detection portion for detecting the first and second frames included in the first TDMA and fist CDMA signals in the first and second modes respectively to produce the frame signal.

According to the present invention there is further provided a third mobile unit communication system comprising: mobile units; a first base station, having a first service area, for transmitting and receiving first and second CDMA signals to and from mobile units within the first service area respectively, the first CDMA signal having a first frame which includes a plurality of first channels in a time division multiple access and time division duplex manner; and a second base station, having a second service area, for transmitting and receiving first and second TDMA signals to and from mobile units within the second service area respectively, the first TDMA signal having a second frame which includes a plurality of second channels in a code division multiple access and time division duplex manner, the first frame has the same length as the second frame, at least one of the first and second base stations further having a frame synchronizing circuit for detecting a phase between the first and second frames and synchronizing the first and second frames each other in accordance with the detected phase, each of the mobile units having: a baseband circuit, having a framing circuit for framing data to be transmitted on the basis of a frame signal and a digital modulation circuit for digital-modulation the data framed, a TDMA signal producing is circuit for producing a TDMA transmission signal to have one of the plurality of first channels, and a CDMA generation circuit for generating a CDMA transmission signal through spectrum spreading with a code defining one of the second channels, and a switch for outputting the TDMA transmission signal in a first mode and supplying the CDMA transmission signal in a second mode; an up-converting circuit for frequency-up-converting the TDMA transmission signal from the switch in the first mode and the CDMA transmission signal from the switch in the second mode; a transmission power control portion for controlling of a power of an output signal from the up-converting circuit; an antenna portion for, in a transmission mode, transmitting an output of the transmission control circuit as the second TDMA signal in the first mode and as the second CDMA signal in the second mode and for, in a receiving mode, receiving the first TDMA signal in the first mode and first CDMA signal in the second mode, the transmission and receiving modes being effected in a time division duplex manner: a demodulation circuit for demodulating the first TDMA and first CDMA signals from the antenna in the first and second modes respectively: a frame detection portion for detecting the first and second frames included in the first TDMA and fist CDMA signals in the first and second modes respectively to produce the frame is signal.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
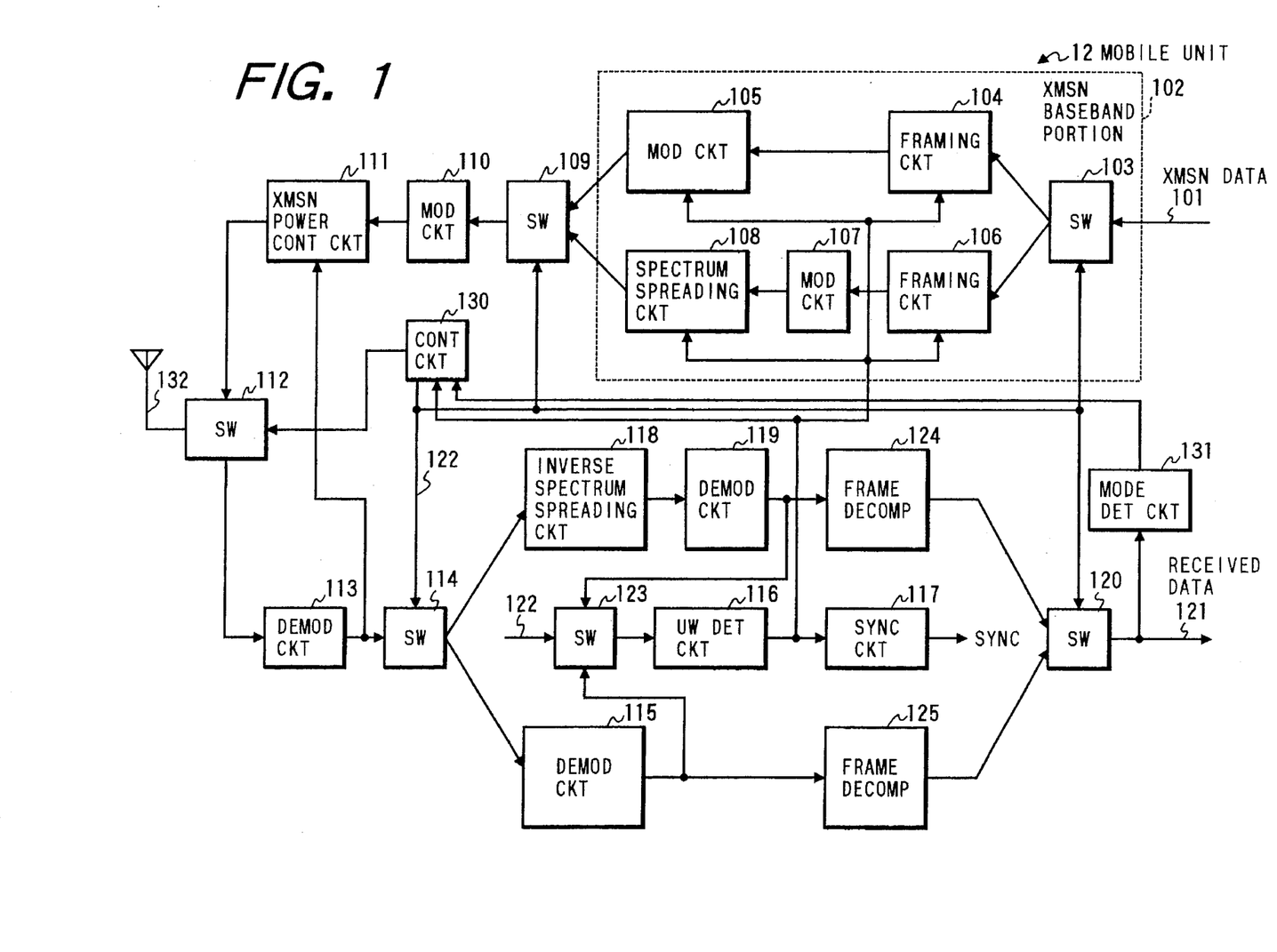
FIG. 1 is a block diagram of a first embodiment of a mobile unit 12.
Figure 2:
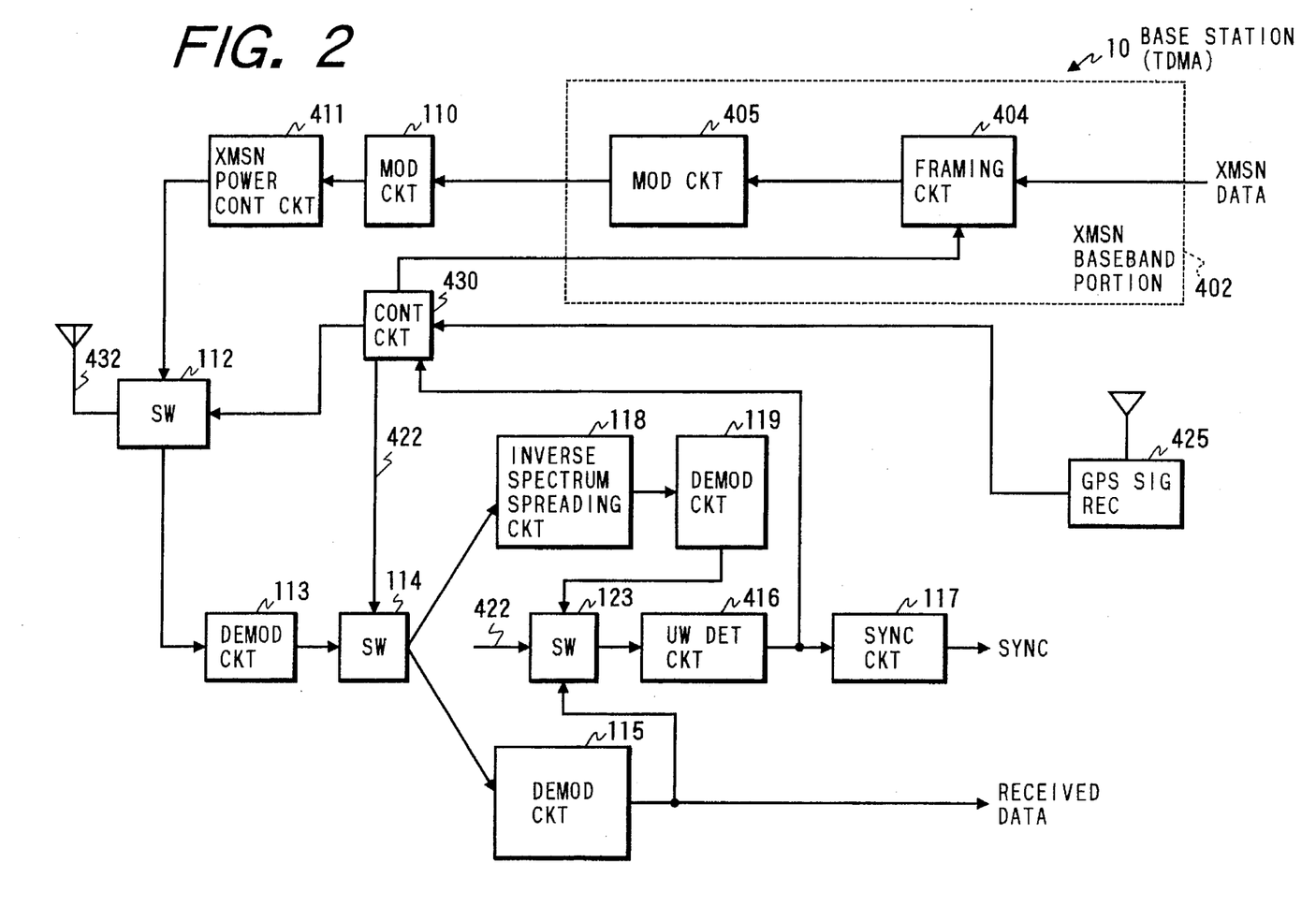
FIG. 2 is a block diagram of the first embodiment of a base station of the TDMA/TDD communication method.
Figure 3:
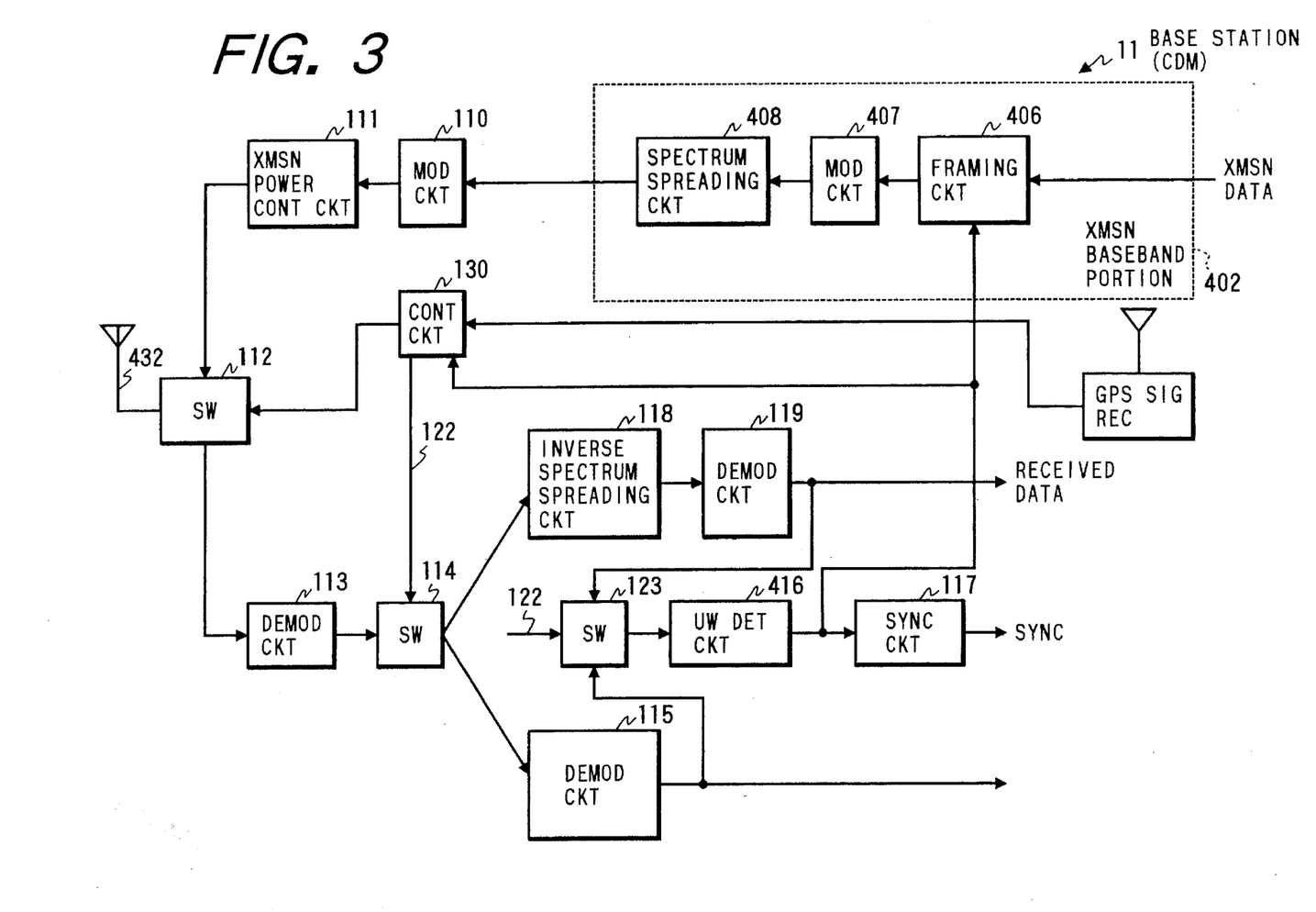
FIG. 3 is a block diagram of the first embodiment of a base station 11 of the CDMA/TDD communication method.
Figure 4A:
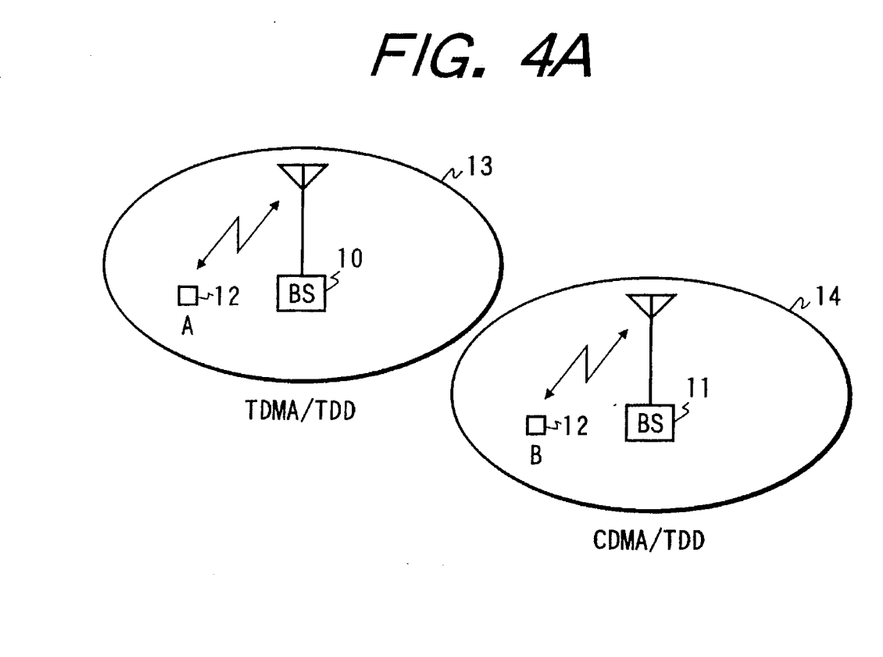
FIGS. 4A and 4B are illustrations of the first embodiment of the mobile unit communication system including the base stations and the mobile units.
Figure 4B:
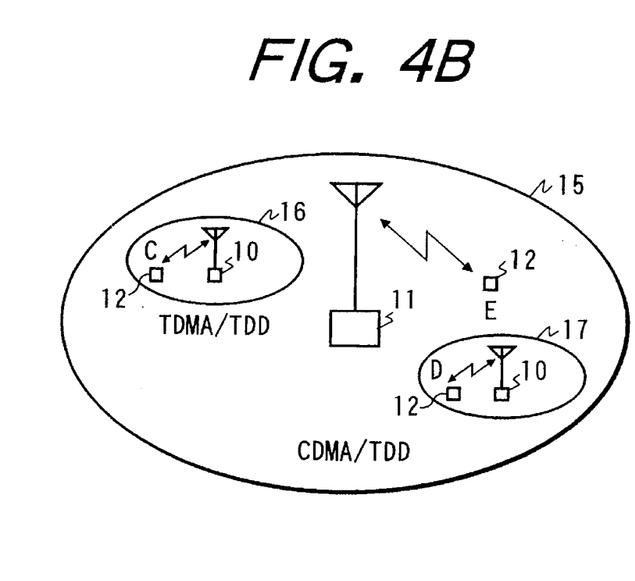
Figure 5:
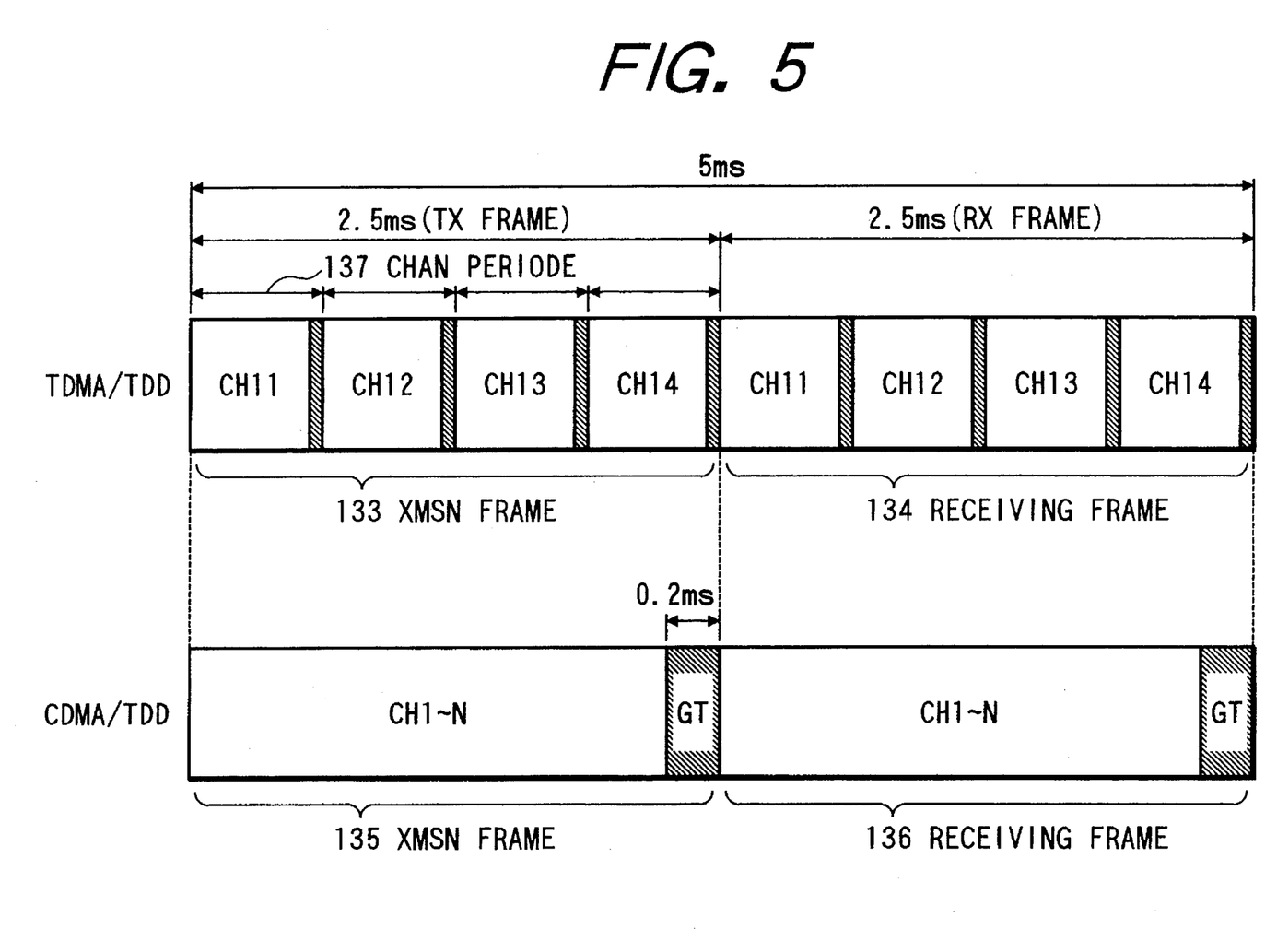
FIG. 5 is an illustration of of this embodiment of frame formats of TDMA/TDD and CDMA/TDD communication methods.

Hereinbelow will be described a first embodiment of this invention. FIG. 1 is a block diagram of the first embodiment of a mobile unit 12. FIG. 2 is a block diagram of a base station 10 of the TDMA/TDD (Time Division Multiple Access/Time division Duplex) communication method. FIG. 3 is a block diagram of a base station 11 of the CDMA/TDD (Code Division Multiple Access/Time division Duplex) communication method. FIGS. 4A and 4B are illustrations of the first embodiment of the mobile unit communication system including the base stations 10 and 11 and the mobile units 12. FIG. 5 is an illustration of of this embodiment of frame formats of TDMA/TDD and CDMA/TDD communication methods. In this invention, there are cases that a service area 13 of the base station 10 of TDMA/TDD is provided adjacent to a service area 14 of CDMA/TDD as shown in FIG. 4A and service areas 16 and 17 of TDMA/TDD are located within a service area 15 of the base station 11 of CDMA/TDD for example. A mobile unit 12 can communicate with the base stations 10 and 11 of TDMA/TDD and CDMA/TDD as shown in FIG. 4B. Therefore, if one mobile unit 12 is located at a point A, it can communicate with the base station 10 of TDMA/TDD and when it moves to a point B, it can communicate with the base station 11 of CDMA/TDD as shown in FIG. 4A. In the case of FIG. 4B, a mobile unit 12 at a point C can communicates with the base stations 10 and 11 of TDMA/TDD and CDMA/TDD.

In this invention, frames of transmitted signals of TDMA/TDD and CDMA/TDD have the same frame length as shown in FIG. 5. That is, a commutation signal is transmitted by a base station 10 for a first interval off 2.5 msec and then, for the following 2.5 msec, the communication signal is received. One frame off the TDMA/TDD includes four channels, for example, in the time division manner. Similarly, in the CDMA/TDD communication methods, a communication signal is transmitted by the base station 11 for a first interval of 2.5 msec and then, for the following 2.5 msec, the communication signal is received. However, multi-channels CH1 to N are included in the transmission frame over the interval of 2.5 msec in the code division manner. Similarly, in the receiving frame the multi-channels CH1 to N are provided over the interval of 2.5 msec in the code division manner. In the TDMA/TDD communication method, a guard time is provided between two consecutive channel intervals. In fact, the guard time is provided as guard bits. Therefore, the guard bits can be considered to be included in the frame length. In the CDMA/TDD communication method, a guard time of 0.2 msec is provided between two consecutive frames, that is between the transmission frame and the receiving frame. The length of the guard time is determined in accordance with the communication condition, for example, radii of the service areas 14 and 15. The base station 10 synchronizes the frame with other adjacent base stations 10 of TDMA/TDD and with adjacent base stations 11 of CDMA/TDD.

As mentioned, the mobile unit 12 can communicate with both base station 10 and 11 of TDMA/TDD and CDMA/TDD with a simple circuit structure without a frame synchronization with other communication system because the frame length of TDMA/TDD is the same as that of CDMA/TDD and the frame synchronization is effected among the adjacent base stations of TDMA/TDD and CDMA/TDD.

In FIG. 1, transmission data 101 is supplied to a framing circuit 104 of a mobile unit 12 in the TDMA mode via a switch 103 and to a framing circuit 106 via the switch 103 in the CDMA mode. The framing circuit 104 frames the transmission data 101. That is, the framing circuit 104 supplies the transmission data to the modulation circuit 105 such that the transmission data has a predetermined data length of one channel within a frame and a unique word for the frame synchronizing and other necessary control data. A modulation circuit 105 effects digital-modulation, i.e., the differential coding, PSK modulation, filtering or the like, to an output of the framing circuit 104 and channel controlling. That is, the modulation circuit 105 supplies modulated transmission data for one of channel periods 137. An output of the modulation circuit 105 is supplied to a modulation circuit 110 via a switch 109 in the TDMA mode. The modulation circuit 110 modulates the output of the modulation circuit 105 through frequency- up-converting. An output of the modulation circuit 110 is supplied to a transmission power control circuit 111. The transmission power control circuit 111 controls a transmission power of the output of the modulation circuit 110 in accordance with a signal receiving level. An output of the transmission power control circuit 111 is supplied to an antenna 132 via switch 112 for the transmission frame period. The antenna transmits the transmission data 101 to have the transmission frame 133 as shown in FIG. 5 to a base station 10 as a TDMA signal.

In the receiving frame period, the antenna 132 receives and supplies a TDMA signal from a base station 10 to a demodulation circuit 113. The demodulation circuit 113 frequency-down-converts and detects the received TDMA signal to obtain a baseband signal. An output of the demodulation circuit 113 is supplied to the transmission power control circuit 111 to control the transmission power to supply the signal receiving level and to a demodulation circuit 115 via a switch 114 in the TDMA mode. The demodulation circuit 115 demodulates the output of the demodulation circuit to reproduce the data transmitted from the base station 10. An output of the demodulation circuit 115 is supplied to a frame decomposition circuit 125. The frame decomposition circuit 125 selectively supplies the received data of a channel used for this mobile unit 12 via the switch 120 in the TDMA/TDD mode. The output of the demodulation circuit 115 is supplied to a unique word detection circuit 116 via a switch 123 in the TDMA mode. The unique word detection circuit 116 detects the unique word to produce and supplies a frame signal to the framing circuits 104 and 106 and modulation circuit 105, or the like. A synchronizing circuit 117 producing synchronizing signal in response to the frame signal from the unique word detection circuit to hold the synchronizing state. The synchronizing signal is used for synchronizing operation in respective circuits of this mobile unit 12. The mode detection circuit 131 detects the TDMA and CDMA modes from the reproduced received data to produce and supply a TDMA/CDMA mode signal to a control circuit 130.

In the CDMA mode, the transmission data 101 is supplied to a framing circuit 106 via the switch 103. The framing circuit 106 frames the transmission data 101. That is, the framing circuit 106 divides the transmission data to have the predetermined data length of one channel and a unique ward for the frame synchronizing and other necessary control data. A modulation circuit 107 effects digital-modulation, i.e., the differential coding, PSK modulation, filtering or the like, to an output of the framing circuit 106. An output of the modulation circuit 107 is supplied to a spectrum spreading circuit 108. The spectrum spreading circuit 108 effects the spectrum spreading and code division multiple operation. That is, the spectrum spreading circuit 108 multiplexes channels to N within the transmission frame 135 with different codes. An output of the spectrum spreading circuit 108 is supplied to a modulation circuit 110 via a switch 109 in the CDMA mode. The modulation circuit 110 modulates the output of the spectrum spreading circuit 108 through frequency-up-converting. An output of the modulation circuit 110 is supplied to the transmission power control circuit 111. The transmission power control circuit 111 controls a transmission power of the output of the modulation circuit 110 in accordance with the signal receiving level. The output of the transmission power control circuit 11 is supplied to the antenna 132 via the switch 112 for the transmission frame period. The antenna 132 transmits the transmission data 101 to have the transmission frame 133 as shown in FIG. 5 to a base station 11 as a CDMA signal.

In the receiving frame period, the antenna 132 receives and supplies a CDMA signal from a base station 11 to a demodulation circuit 113. The demodulation circuit 113 down-converts and detects the received CDMA signal to obtain a baseband signal. The output of the demodulation circuit 113 is supplied to the transmission power control circuit 111 to control the transmission power and to a inverse spectrum spreading circuit 118 via the switch 114. The inverse spectrum spreading circuit 118 effects the inverse spectrum spreading operation to reproduce the data transmitted from the base station 12 with a unique code to detects the necessary channel data. An output of the inverse spectrum spreading circuit 118 is supplied to a demodulation circuit 119. The demodulation circuit 119 effects a digital demodulating, for example, PSK demodulating to the output of the inverse spectrum spreading circuit 118. An output of the demodulation circuit 119 is supplied to a frame decomposition circuit 124. The frame decomposition circuit 124 reproduces the received data from the output of the demodulation circuit 119. That is, the frame decomposition circuit 124 removes the unique word and other control data from the output of the demodulation circuit 119. The received data is outputted via the switch 120 and supplied to a mode detection circuit 131. The output of the demodulation circuit 119 is also supplied to the unique word detection circuit 116 via switch 123 in the CDMA mode. The unique word detection circuit 116 detects the unique word to produce and supplies a frame signal to the framing circuits 104 and 106 and modulation circuit 105 and the spectrum spreading circuit 108. The synchronizing circuit 117 produces the synchronizing signal in response to the frame signal. The mode detection circuit 131 detects the TDMA and CDMA modes from the reproduced received data to produce and supply a TDMA/CDMA mode signal to the control circuit 130.

The control circuit 130 controls the switch 112 in response to the frame signal to effect the TDD operation of transmission of data and the receiving of data alternately. The control circuit 130 supplies the received signal by the antenna 132 to the demodulation circuit 113 for the receiving period and determine which mode of TDMA and CDMA is used in the present location of the mobile unit 12 to produce the mode signal. That is, if the received data 121 is present when the switch 114 connects the demodulation circuit 113 and the demodulation circuit 115, the mobile unit 12 is within a service area of a TDMA base station 10.

If the received data 121 is present when the switch 114 is connects the demodulation circuit 113 to the inverse spectrum spreading circuit 118, the mobile unit 12 is within a service area of a CDMA base station 11. If both TDMA and CDMA signals can be received, the control circuit 130 changes the mode between the TDMA and CDMA as necessary. The control circuit 130 produces receiving/transmitting mode signal supplied to the switch 112 in response to the frame signal from the unique word detection circuit 116. The synchronizing circuit 117 produces the synchronizing signal in response to the frame signal.

In the mobile unit communication system as mentioned above, when the mobile unit 12 at the point A moves from the service area 14 of CDMA/TDD, the mobile unit 12 can communicate with the base station 10 without a special frame synchronizing operation because the frames of TDMA/TDD and CDMA/TDD signals are synchronized and have the same frame length. In FIG. 4B, the mobile unit 12 at point C can communicate with the base station 10 of TDMA/TDD and the base station 11 of CDMA/TDD. However, either of the base station 10 or 11 is selected normally.

In this embodiment, the frequency band and the amount of data, i.e., bits are common between the TDMA/TDD and CDMA/TDD transmission systems, so that the modulation circuit 110, the transmission power control circuit 111, the switch 112, the antenna 132, demodulation circuit 113, are commonly used between the TDMA/TDD and CDMA/TDD. Moreover, the unique word and other control data is commonly defined, so that the unique word detection circuit 116 is used commonly between the TDMA/TDD and CDMA/TDD modes. Moreover, modulation and demodulation operations in the modulation circuit 110 and the demodulation circuit 113 are common, so that a simple structure is provided. However, in the modulation circuit 110, only a clock signal is changed between the TDMA/TDD and CDMA/TDD modes. In this embodiment, the switches 103 and 114 are provided for a stable operation. However, these switches 103 and 114 can be omitted.

Figure 6:
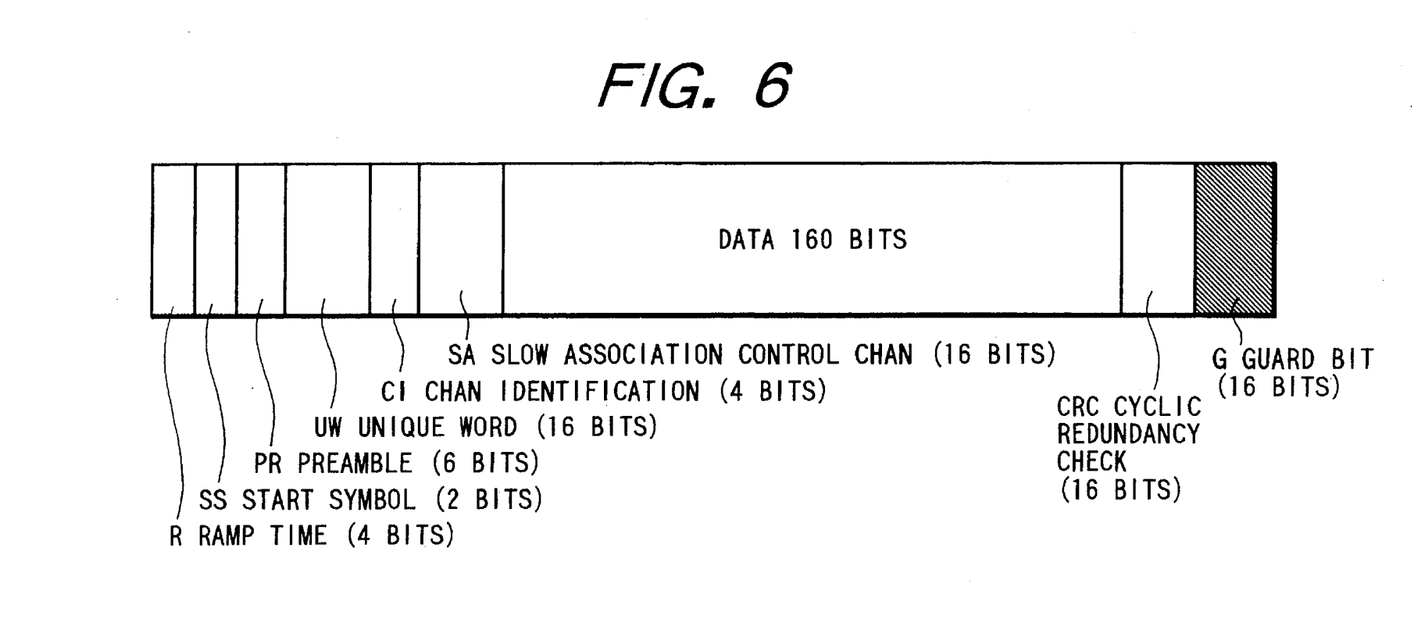
FIG. 6 is an illustration of the first embodiment showing dat format of the TDMA/TDD.

The base stations 10 and 11 have the similar circuit structure to the mobile unit 12. In FIG. 2, the base station 10 of TDMA/TDD system transmits data of plurality of channels in TDMA/TDD manner. Transmission data of channels CH11 to CH14 is supplied to a framing circuit 404 of the base station 10. The framing circuit 104 frames the transmission data. That is, the framing circuit 104 supplies the transmission data to the modulation circuit 405 such that the transmission data has a predetermined data length of a frame and a unique word for the frame synchronizing and other necessary control data. FIG. 6 is an illustration of this embodiment showing data format of one channel of the TDMA/TDD. In the channel CH11, the unique word is present, so that the transmission frame is determined. A modulation circuit 405 effects digital-modulation, i.e., the differential coding, PSK modulation, filtering or the like, to an output of the framing circuit 404 and channel controlling to provide channels CH11 to CH14. The modulation circuit 405 supplies modulated transmission data of channels CH11 to CH14. An output of the modulation circuit 405 is supplied to the modulation circuit 110. The modulation circuit 110 modulates the output of the modulation circuit 405 through frequency-up-converting. The output of the modulation circuit 110 is supplied to a transmission power control circuit 411 to have a suitable transmission level. An output of the transmission power control circuit 411 is supplied to an antenna 432 via switch 112 for the transmission frame period. The antenna 432 transmits the transmission data of CH11 to CH14 having the transmission frame 133 as shown in FIG. 5 to mobile units as a TDMA signal.

In the receiving frame period, the antenna 432 receives and supplies TDMA signals from mobile units 12 within the service area thereof and supplies the TDMA signals to a demodulation circuit 113 through a switch 112 in response to a control circuit 430. The demodulation circuit 113 down-converts and detects the received TDMA signals to obtain a baseband signal. The output of the demodulation circuit 113 is supplied to the demodulation circuit 115 via the switch 114 controlled by a control signal 422. The demodulation circuit 115 demodulates the output of the demodulation circuit 118 to reproduce the data transmitted from the mobile units 12. An output of the demodulation circuit 115 is outputted as received data off channels CH11 to CH14.

A unique word detection circuit 416 detects the unique word in the channel CH11 from adjacent base stations 10 of TDMA/TDD to obtain the frame synchronization via a switch 123 controlled by the control signal 422. The base station 10 of TDMA/TDD can receive a CDMA signal from adjacent base stations 11 by the inverse spectrum spreading circuit 118 and time demodulation circuit 119. The unique word detection circuit 416 detects the unique word from the CDMA signal to obtain frame synchronization through the inverse spectrum spreading circuit 118 and the demodulation circuit 119, so that the frame synchronization between the base stations 10 and 11 of TDMA and CDMA is provided. Moreover, a GPS signal receiving unit 425 receives a GPS (global positioning system) signal from a GPS satellite (not shown). The control circuit 430 obtains the frame synchronization from the TDMA signal, CDMA signal, and GPS signal. A synchronizing circuit produces a synchronizing signal in response to the frame signal Similarly, the base station 11 of CDMA has a transmission baseband portion 402 for transmitting only the CDMA signal but both receiving circuits of TDMA and CDMA to obtain the frame synchronization. In this embodiment, the frame synchronization is effected in both base stations 10 and 11. However, the frame synchronizing is provided by frame synchronization by at least one of base stations 10 and 11.

As mentioned above, the frame synchronization between the base stations 10 and 11 of TDMA and CDMA is provided and the length of frames of TDMA and CDMA is common, so that if the mobile unit 12 at the point A moved from the service area 14 of CDMA/TDD can communicate with the base station 10 without a special frame synchronizing operation.

Figure 7:
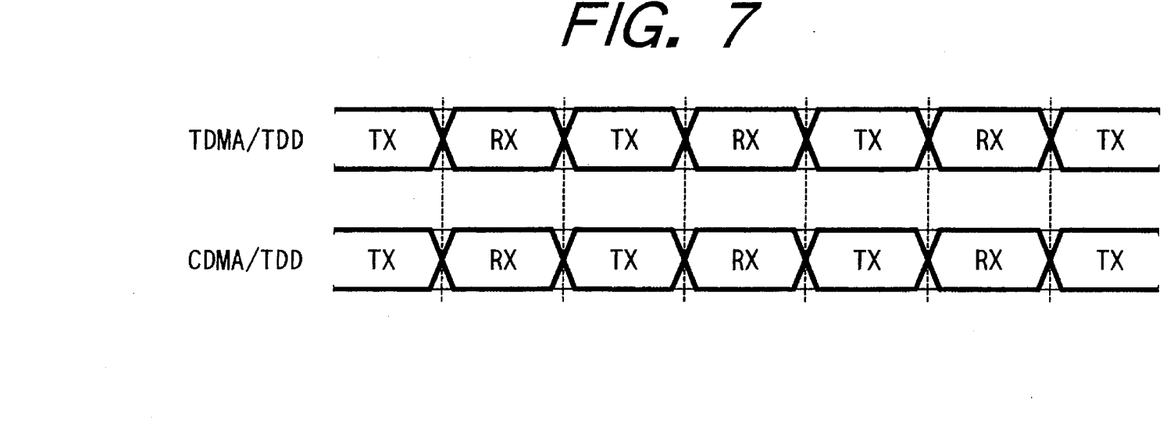
FIG. 7 is an illustration of the first embodiment showing a phase relation of frames between the TDMA signal and CDMA signal.

FIG. 7 is an illustration of the first embodiment showing a phase relation of frames between the TDMA signal and CDMA signal. As shown in FIG. 7, transmission and receiving frames of the TDMA signal are in phase with those of the CDMA signal, so that the mobile unit 12 having transmitting and receiving circuits of the TDMA and CDMA signals can switch the communication state between the TDMA and CDMA signals without an additional frame synchronizing operation.

Figure 8:
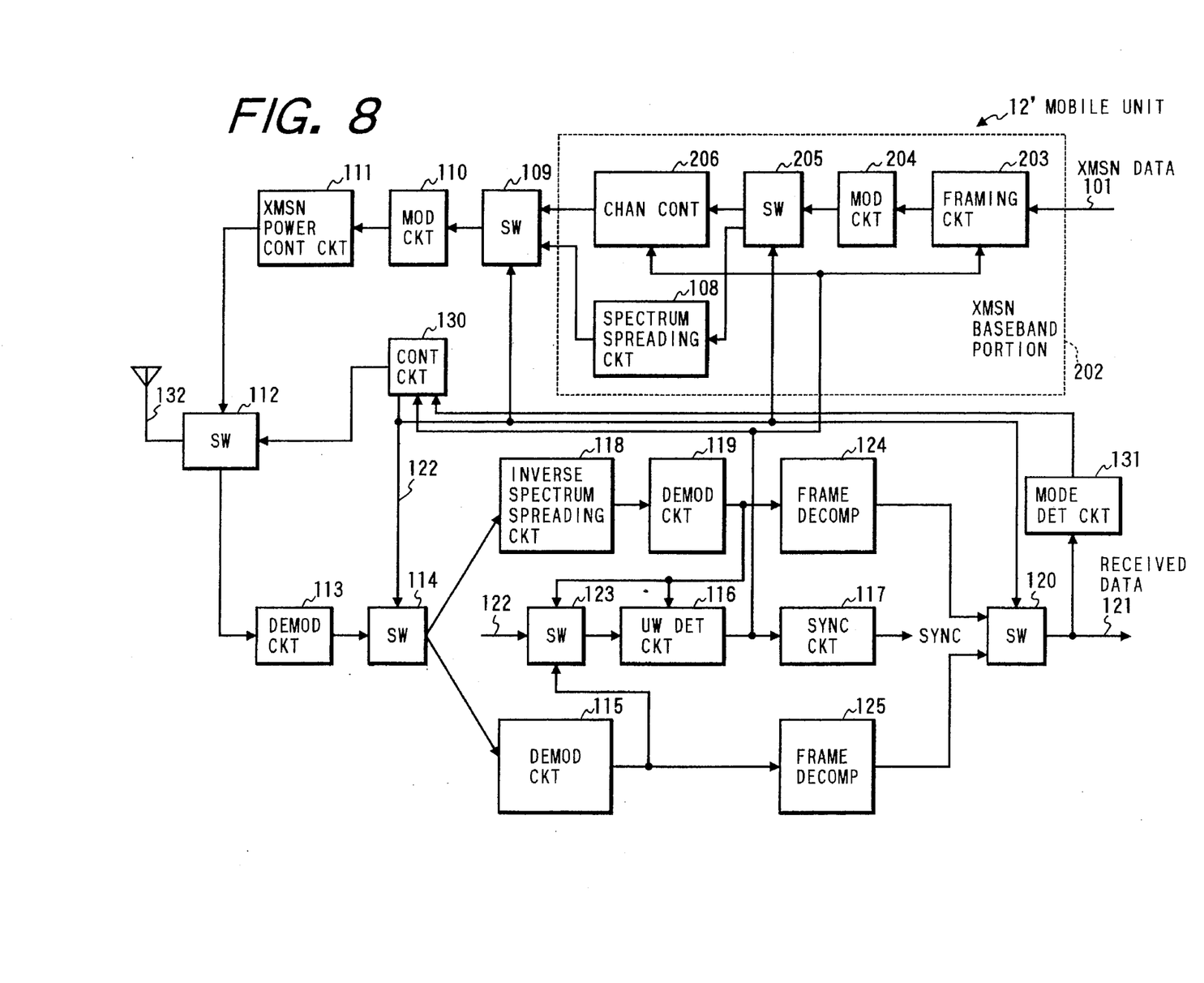
FIG. 8 is a block diagram of a mobile unit of a second embodiment.

FIG. 8 is a block diagram of a mobile unit 12' of a second embodiment. In this embodiment, the unique word for producing the frame signal and other control data are defined commonly between the TDMA and CDMA modes and the same modulation processing is effected to the TDMA and CDMA signals in the transmission baseband portion 202, such as PSK modulation or the like, so that a framing circuit 203 and a modulation circuit 204 are commonly used between the TDMA and CDMA modes.

In FIG. 8, transmission data 101 is supplied to a framing circuit 203 of the mobile unit 12' in the TDMA and CDMA modes. The framing circuit 104 frames the transmission data 101 on the basis of a frame signal. That is, the framing circuit 203 supplies the transmission data to the modulation circuit 204 such that the transmission data has a predetermined data length off one channel within a frame and a unique ward for the frame synchronizing and other necessary control data. A modulation circuit 205 effects digital-modulation, i.e., the differential coding, PSK modulation, filtering or the like, to an output of the framing circuit 203 and channel controlling. A switch 205 supplies an output of the modulation circuit 204 to a channel control circuit 206 in the TDMA mode and to the spectrum spreading circuit 108 in the CDMA mode. The channel control circuit 205 supplies modulated transmission data for one of channel periods 137. An output of the channel control circuit 206 is supplied to the modulation circuit 110 via the switch 109 in the TDMA mode.

In the CDMA mode, the output of the modulation circuit 204 supplied via the switch 205 is spectrum spread by the spectrum spreading circuit 108. That is, the spectrum spreading circuit 108 effects the spectrum spreading and code division multiple operation with a code defining every channels.

The modulation circuit 110 modulates the output of the modulation circuit 105 through up-converting. An output of the modulation circuit 110 is supplied to a transmission power control circuit 111. The transmission power control circuit 111 controls a transmission power of the output of the modulation circuit 110 in accordance with a signal receiving level. An output of the transmission power control circuit 111 is supplied to an antenna 132 via switch 112 for the transmission frame period. The antenna 132 transmits the transmission data 101 to have the transmission frame 133 as shown in FIG. 5 to a base station 10 in the TDMA and CDMA modes.

The receiving operations of the TDMA and CDMA signals are the same as the first embodiment.

As mentioned, the unique word for producing the frame signal and other control data are defined commonly between the TDMA and CDMA modes and the same modulation processing is effected to the TDMA and CDMA signals in the transmission baseband portion 202, such as PSK modulation or the like, so that he framing circuit 203 and the modulation circuit 204 are commonly used between the TDMA and CDMA modes.

What is claimed is:

1. A mobile unit communication system comprising:

mobile units;

a first base station, having a first service area, for transmitting and receiving a first communication signal having a first frame to and from mobile units within said first service area, said first base station communicating with said mobile units through a plurality of first channels by a time division multiple access and time division duplex (TDMA/TDD) format through said first communication signal; and a second base station, having a second service area adjacent to or overlapping said first service area, for transmitting and receiving a second communication signal having a second frame to and from mobile units within said second service area, said first and second frames having the same length, said second base station communicating with said mobile units within said second service area through a plurality of second channels by a code division multiple access and time division duplex (CDMA/TDD) format through said second communication signal, at least one of said first and second base stations having a frame synchronizing portion for detecting a phase between said first and second frames and synchronizing said first and second frames in accordance with said detected phase, each of said mobile units having:

a first communication circuit for communicating with said first base station through said first communication signal in a first mode; and a second communication circuit for communicating with said second base station through said second communication signal in a second mode.

2. A mobile unit communication system as claimed in claim 1, wherein said second area is larger than said first area and said first area is provided within said second area.

3. A mobile unit communication system as claimed in claim 1, wherein said first and second base stations transmit said first and second communication signals to have the same frequency band and said each of mobile units further comprises an antenna for receiving and transmitting said first and second communication signals and a switch responsive to a mode signal indicative of said first and second modes for supplying said first communication signal between said antenna and said first communication circuit in said first mode and for supplying said second communication signal between said antenna and said second communication circuit in said second mode.

4. A mobile unit communication system as claimed in claim 1, wherein each of said mobile units further comprises:

a modulation circuit for modulating said first and second communication signals in common in said first and second modes;

an antenna for receiving and transmitting said first and second communication signals;

a demodulation circuit for demodulating said first and second communication signals in common; and a switch responsive to a receiving/transmitting signal indicative of receiving and transmitting modes for supplying at least one of said first communication signal and said second communication signal from said modulation circuit to said antenna in said transmitting mode and supplying said first and second communication signals from said antenna to said demodulation circuit in said receiving mode.

5. A mobile unit communication system as claimed in claim 1, wherein said first and second communication signals have first and second frames respectively, said first and second frames having the same amount of data and each of said mobile units further comprising a baseband data processing portion for processing data to be transmitted and for supplying said processed data to said first communication circuit in said first mode and to said second communication circuit in said second mode.

6. A mobile unit communication system as claimed in claim 1, wherein each of said mobile units further comprises a framing circuit for framing data to be transmitted and for supplying said framed data to said first communication circuit in said first mode and to said second communication circuit in said second mode.

7. A mobile unit communication system comprising:

mobile units;

a first base station, having a first service area, for transmitting and receiving first and second TDMA signals to and from mobile units within said first service area respectively, said first TDMA signal having a first frame which includes a plurality of first channels in a time division multiple access and time division duplex (TDMA/TDD) format; and a second base station, having a second service area, for transmitting and receiving first and second CDMA signals to and from mobile units within said second service area respectively, said first CDMA signal having a second frame which includes a plurality of second channels in a code division multiple access and time division duplex (CDMA/TDD) format, said first frame having the same length as said second frame, at least one of said first and second base stations further having a frame synchronizing circuit for detecting a phase between said first and second frames and synchronizing said first and second frames with each other in accordance with said detected phase, each of said mobile units having:

a baseband circuit for framing data to be transmitted on the basis of a frame signal and for digitally modulating said data frame to produce first and second baseband signals in first and second modes respectively;

an up-converting circuit for frequency-up-converting said first baseband signal in said first mode and said second baseband signal in said second mode, a transmission power control circuit for controlling a power of an output signal from the up-converting circuit;

an antenna portion for, in a transmission mode, transmitting an output of said transmission power control circuit as said second TDMA signal in said first mode and as said second CDMA signal in said second mode and for, in a receiving mode, receiving said first TDMA signal in said first mode and said first CDMA signal in said second mode, said transmission and receiving modes being effected in the time division duplex format;

a demodulation circuit for demodulating said first TDMA and first CDMA signals from said antenna in said first and second modes respectively;

a frame detection portion for detecting at least one of said first and said second frame to thereby produce said frame signal.

8. A mobile unit communication system as claimed in claim 7, wherein said baseband circuit having first and second framing circuits for framing said data to be transmitted to have said first and second frame in said first and second modes respectively, a first digital modulation circuit for digital-modulating an output of said first framing circuit, a second digital modulation circuit for digital-modulating an output of said second framing circuit, and a code division multiplexing circuit for code-division-multiplexing to an output of said second digital modulation circuit, and a switch for supplying an output of said first digital modulation circuit as said first baseband signal in said first mode and an output of said code division multiplexing circuit as said second baseband signal in second mode.

9. A mobile unit communication system comprising:

mobile units;

a first base station, having a first service area, for transmitting and receiving first and second TDMA signals to and from mobile units within said first service area respectively, said first TDMA signal having a first frame which includes a plurality of first channels in a time division multiple access and time division duplex (TDMA/TDD) format; and a second base station, having a second service area, for transmitting and receiving first and second CDMA signals to and from mobile units within said second service area respectively, said first CDMA signal having a second frame which includes a plurality of second channels in a code division multiple access and time division duplex (CDMA/TDD) format, said first frame having the same length as said second frame, at least one of said first and second base stations further having a frame synchronizing circuit for detecting a phase between said first and second frames and synchronizing said first and second frames with each other in accordance with said detected phase, each of said mobile units having:

a baseband circuit, having a framing circuit for framing data to be transmitted on the basis of a frame signal and a digital modulation circuit for digitally modulating said data frame, a TDMA signal producing circuit for producing a TDMA transmission signal to have one of said plurality of first channels, and a CDMA generation circuit for generating a CDMA transmission signal through spectrum spreading with a code defining one of said second channels, and a switch for outputting said TDMA transmission signal in a first mode and supplying said CDMA transmission signal in a second mode;

an up-converting circuit for frequency-up-converting said TDMA transmission signal from said switch in said first mode and said CDMA transmission signal from said switch in said second mode;

a transmission power control portion for controlling a power of an output signal from the up-converting circuit;

an antenna portion for, in a transmission mode, transmitting an output of said transmission power control circuit as said second TDMA signal in said first mode and as said second CDMA signal in said second mode and for, in a receiving mode, receiving said first TDMA signal in said first mode and first CDMA signal in said second mode, said transmission and receiving modes being effected in the time division duplex format;

a demodulation circuit for demodulating said first TDMA and first CDMA signals from said antenna in said first and second modes respectively; and a frame detection portion for detecting at least one of said first and second frame to thereby produce said frame signal.

10. A mobile unit communication system as claimed in claim 7, wherein said demodulation circuit comprises: a down-converting circuit for down-converting and detecting said first TDMA signal and said first CDMA signal from said antenna portion to produce a third baseband signal, a TDMA demodulating circuit for demodulating said third baseband signal, and an inverse spread spectrum circuit for inverse-spectrum spreading said baseband signal, a switch for supplying said third baseband signal to said TDMA demodulating circuit in said first mode and to said inverse spectrum spreading circuit in said second mode, and a CDMA demodulating circuit for demodulating an output of said inverse spectrum spreading circuit.

11. A mobile unit communication system as claimed in claim 7, wherein said baseband circuit having first and second framing circuits for framing said data to be transmitted to have third and fourth frames in response to said frame signal respectively, a first digital modulation circuit for digitally modulating an output of said first framing circuit, a second digital modulation circuit form digitally modulating an output of said second framing circuit, and a code division multiplexing circuit for code-division-multiplexing an output of said second digital modulation circuit.

12. A mobile unit communication system as claimed in claim 6, wherein said framing circuit adds a frame synchronizing signal and control data to said data and supplies said framed data.

13. A mobile unit communication system as claimed in claim 6, further comprising a digital modulation circuit for digitally modulating said framed data and supplying said framed data to said first communication circuit in said first mode and said second communication circuit in said second mode.

14. A mobile unit communication system as claimed in claim 1, further comprising a mode detection circuit for generating a mode signal indicative of said first and second modes in accordance with outputs of said first and second communication circuits.

15. A mobile unit communication system as claimed in claim 4, further comprising a frame detection circuit for detecting said first frame from said first communication signal from said antenna in said first mode and detecting said second frame from said second communication signal from said antenna in said second mode to produce a frame signal and a control circuit for producing said receiving/transmitting signal in response to said frame signal.

16. A mobile unit communication system comprising:

a first receiving circuit for receiving a first TDMA signal having a first frame and a plurality of first channels in said first frame provided by a time division multiple access and time division duplex (TDMA/TDD) format in a first mode;

a second receiving circuit for receiving a first CDMA signal having a second frame and a plurality of second channels provided by a code division multiple access and time division duplex (CDMA/TDD) format in a second mode, wherein said first frame has the same length as said second frame and said first frame is synchronized with said second frame;

synchronizing detection means for detecting at least one of said first and second frame and for producing a frame synchronizing signal;

framing circuit for framing data to be transmitted in response to said frame synchronizing signal, for producing a second TDMA signal from said framing data to have a third frame in said first mode, and producing said CDMA signal from said framing data to have a fourth frame in said second mode, wherein said third frame is the same length as said fourth frame and said first to fourth frames have a synchronizing relationship with each other; and a transmitting circuit for transmitting said second TDMA signal in said first mode for transmitting said CDMA signal in said second mode.

17. A mobile unit as claimed in claim 16, wherein said first and second TDMA signals and said first and second CDMA signals have the same frequency band.

18. A mobile unit communication system as claimed in claim 17, further comprising:

a modulation circuit for modulating said second TDMA and CDMA signals in common in said first and second modes respectively;

an antenna for receiving said first TDMA and CDMA signals and transmitting said second TDMA and CDMA signals from said modulation circuit;

a demodulation circuit for demodulating said first TDMA and CDMA signals in common.

19. A mobile unit communication system as claimed in claim 16, wherein said first and second frames include the same amount of data.

20. A mobile unit communication system as claimed in claim 16, further comprising a baseband data processing circuit for processing data to be transmitted in said first and second modes in common and for supplying said processed data to said transmitting circuit.

21. A mobile unit communication system as claimed in claim 16, further comprising a framing circuit for framing data to be transmitted and adding common frame synchronizing data to said data in said first and second modes and for supplying said framed data to said transmitting circuit.

22. A mobile unit communication system as claimed in claim 16, wherein said framing circuit adds common control data to said data in said first and second modes.

23. A mobile unit communication system comprising:

a baseband circuit for framing data to be transmitted on the basis of a frame signal to have first and second frames respectively and for digitally modulating said data to produce a first TDMA/TDD baseband signal having a time division multiple access and time division duplex format and a first CDMA/TDD baseband signal having a code division multiple access and time division duplex format in first and second modes respectively, said first and second frame having the same length;

an up-converting circuit for frequency-up-converting said first TDMA/TDD baseband signal and said first CDMA/TDD baseband signal in common in said first and second modes;

a transmission power control circuit for controlling a power of an output signal from the up-converting circuit;

a transmitting and receiving circuit for, in a transmission mode, transmitting an output of said transmission power control circuit in common in said first and second modes and for, in a receiving mode, receiving a TDMA signal having a third frame in said first mode and a CDMA signal having a fourth frame in said second mode, said transmission and receiving modes being effected in a time division duplex format, said third frame being synchronized with said fourth frame;

a demodulation circuit for demodulating said TDMA and CDMA signals from said transmitting and receiving circuit in common in said first and second modes and for outputting a demodulation output signal;

a frame detection portion for detecting either of said third or fourth frame to produce said frame signal.

24. A mobile unit communication system as claimed in claim 23, wherein said baseband circuit comprises:

first and second framing circuits for framing said data to be transmitted to have first and second frames in said first and second modes;

a first digital modulation circuit for digitally modulating an output of said first framing circuit;

a second digital modulation circuit for digitally modulating an output of said second framing circuit;

a code division multiplexing circuit for code-division-multiplexing an output of said second digital modulation circuit; and a switch for supplying an output of said first digital modulation circuit to said up-converting circuit in said first mode and an output of said code division multiplexing circuit to said up-converting circuit in said second mode.

25. A mobile unit communication system comprising:

a baseband circuit including a framing circuit for framing data to be transmitted on the basis of a frame signal to have first and second frames and adding common frame synchronizing data to said data in first and second modes;

a digital modulation circuit for digitally modulating said data;

a TDMA signal producing circuit for producing a TDMA transmission signal from said data from said digital modulation circuit;

a CDMA generation circuit for generating a CDMA transmission signal through spread spectrum spreading from said digital modulation circuit;

a switch for outputting said TDMA transmission signal in said first mode and supplying said CDMA transmission signal in said second mode;

an up-converting circuit for frequency-up-converting said TDMA transmission signal from said switch in said first mode and said CDMA transmission signal from said switch in said second mode in common;

a transmission power control portion for controlling a power of an output signal from the up-converting circuit;

an antenna portion for, in a transmission mode, transmitting an output of said transmission control circuit in said first and second modes and for, in a receiving mode, receiving a TDMA signal having a third frame in said first mode and a CDMA signal having a fourth frame in said second mode, said transmission and receiving modes being effected in a time division duplex manner;

a demodulation circuit for demodulating said TDMA and CDMA signals from said antenna portion in said first and second modes respectively and outputting demodulated data, said TDMA and CDMA signals having second common frame synchronizing data and a common frame length; and a frame detection portion for detecting either of said third or fourth frames to produce said frame signal.

26. A mobile unit communication system as claimed in claim 25, wherein said demodulation circuit comprises:

a down-converting circuit for down-converting and detecting said second TDMA signal and said second CDMA signal to produce a third baseband signal;

a TDMA demodulating circuit for demodulating said third baseband signal;

an inverse spectrum spreading circuit for inverse-spectrum spreading said third baseband signal;

a switch for supplying said third baseband signal to said TDMA demodulating circuit in said first mode and to said inverse spectrum spreading circuit in said second model and a CDMA demodulating circuit for demodulating an output of said inverse spectrum spreading circuit.

27. A mobile unit communication system as claimed in claim 25, wherein said baseband circuit includes:

first and second framing circuits for framing said data to be transmitted to have said first and second frames respectively;

a first digital modulation circuit for digitally modulating an output of said first framing circuit;

a second digital modulation circuit for digitally modulating said second framing circuit; and a code division multiplexing circuit for code-division-multiplexing an output of said second digital modulation circuit.

28. A mobile unit communication system for communicating with a mobile unit comprising:

a first base station, having a first service area, for transmitting and receiving a first communication signal having a first frame to and from said mobile unit within said first service area, said first base station communication with said mobile unit through a plurality of first channels by a time division multiple access and time division duplex (TDMA/TDD) format through said first communication signal; and a second base station, having a second service area adjacent to or overlapping said first service area, for transmitting and receiving a second communication signal having a second frame to and from said mobile unit within said second service area, said first and second frames having the same length, said second base station communication with said mobile unit within said second service area through a plurality of second channels by a code division multiple access and time division duplex (CDMA/TDD) format through said second communication signal, at least one of said first and second base stations having a frame synchronizing portion for detecting a phase between said first and second frames and synchronizing said first and second frames in accordance with said detected phase.

29. A mobile unit communication system as claimed in claim 28, wherein said second area is larger than said first area and said first area is provided within said second area.

30. A mobile unit communication system as claimed in claim 28, wherein said first and second base stations transmit said first and second communication signals in the same frequency band.

31. A mobile unit communication system as claimed in claim 28, wherein said first and second communication signals have first and second frames respectively, and said first and second frames include the same amount of data.

32. A mobile unit communication system as claimed in claim 7, wherein said first TDMA signal includes first synchronizing data which defines said first frame, said first CDMA signal includes second synchronizing data which defines said second frame, said frame synchronizing circuit detects said phase through detecting said first and second synchronizing data, and said frame detection portion detects at least one of said first and second frames by detecting at least one of said first and said second synchronizing data.

33. A mobile unit communication system as claimed in claim 9, wherein said first TDMA signal includes first synchronizing data which defines said first frame, said first CDMA signal includes second synchronizing data which defines said second frame, said frame synchronizing circuit detects said phase through detecting said first and second synchronizing data, and said frame detection portion detects at least one of said first and second frames by detecting at least one of said first and said second synchronizing data.

34. A mobile unit communication system as claimed in claim 23, wherein said TDMA signal includes first synchronizing data which defines said third frame, said first CDMA signal includes a second synchronizing data which defines said fourth frame, and said frame detection portion detects at least one of said third and fourth frame by detecting at least one of said first and said second synchronizing data to have a synchronizing relationship among said first to fourth frames.

35. A mobile unit communication system as claimed in claim 25, wherein said TDMA signal includes first synchronizing data which defines said third frame, said first CDMA signal includes a second synchronizing data which defines said fourth frame, and said frame detection portion detects at least one of said third or fourth frame by detecting at least one of said first and said second synchronizing data to have a synchronizing relationship among said first to fourth frames.

* * * * *